(12) United States Patent
Stimits

(10) Patent No.: US 9,995,615 B2
(45) Date of Patent: Jun. 12, 2018

(54) HYDROGEN GENERATOR WITH FUEL GAUGE

(71) Applicant: Intelligent Energy Inc., San Jose, CA (US)

(72) Inventor: Jason L. Stimits, Avon, OH (US)

(73) Assignee: INTELLIGENT ENERGY INC., San Jose, CA (US)

(*) Notice: Subject to any disclaimer, the term of this patent is extended or adjusted under 35 U.S.C. 154(b) by 116 days.

(21) Appl. No.: 14/816,482

(22) Filed: Aug. 3, 2015

(65) Prior Publication Data

US 2015/0338260 A1    Nov. 26, 2015

Related U.S. Application Data

(63) Continuation of application No. PCT/US2013/025657, filed on Feb. 12, 2013.

(51) Int. Cl.
  *G01F 23/24*     (2006.01)
  *H01M 8/0432*   (2016.01)
  (Continued)

(52) U.S. Cl.
  CPC ...... *G01F 23/246* (2013.01); *H01M 8/04216* (2013.01); *H01M 8/04373* (2013.01); *H01M 8/065* (2013.01)

(58) Field of Classification Search
  CPC .. G01F 23/246; G01F 23/24; H01M 8/04216; H01M 8/04373; H01M 8/065
  (Continued)

(56) References Cited

U.S. PATENT DOCUMENTS 6,155,099 A    12/2000    Kobayashi et al.
6,749,702 B1    6/2004    Knowlton et al.
(Continued)

FOREIGN PATENT DOCUMENTS

EP              2424023 A2    2/2012
WO    WO 2014/077868 A1    5/2014

OTHER PUBLICATIONS

Diwan et al.; "Combustion Wave Propagation in Magnesium/Water Mixtures: Experiments and Model"; Chemical Engineering Science; Jan. 2010; vol. 65 Issue 1; p. 80-87.
(Continued)

*Primary Examiner* — Hezron W Williams
*Assistant Examiner* — Marrit Eyassu
(74) *Attorney, Agent, or Firm* — Baker & Hostetler LLP

(57) ABSTRACT

The invention is a hydrogen generator with a fuel gauge and a method of fuel gauging. The hydrogen generator includes a replaceable fuel unit, containing a hydrogen-containing material (fuel) that can release hydrogen gas when heated and whose thermal conductivity is related to a quantity of releasable hydrogen contained therein, and a fuel gauge including a heat source and a temperature sensor adjacent to the fuel unit and a controller for determining a fuel level value based on a measured temperature. The temperature is measured at a pre-established time after activating the heat source, and the measured temperature is compared to a predetermined relationship between the measured temperature and a releasable hydrogen content in the fuel at the pre-established time. An output signal is provided (e.g., to a visible display, an audible signal or a controller).

15 Claims, 3 Drawing Sheets

(51) Int. Cl.
*H01M 8/065* (2016.01)
*H01M 8/04082* (2016.01)

(58) Field of Classification Search
USPC .......................................................... 73/295
See application file for complete search history.

(56) References Cited

U.S. PATENT DOCUMENTS

| | | |
|---|---|---|
| 7,117,732 B2 | 10/2006 | Curello et al. |
| 7,237,428 B2 | 7/2007 | Dacosta et al. |
| 7,241,527 B2 * | 7/2007 | Liu .................... H01M 8/065 428/378 |
| 7,254,983 B2 | 8/2007 | Dacosta et al. |
| 7,642,742 B2 * | 1/2010 | Curello ............ H01M 8/04089 320/101 |
| 7,674,541 B2 | 3/2010 | Ihara et al. |
| 7,698,936 B2 | 4/2010 | Curello et al. |
| 7,867,441 B2 | 1/2011 | Eckels et al. |
| 7,964,111 B2 | 6/2011 | Perut et al. |
| 8,268,028 B2 | 9/2012 | Kelly et al. |
| 8,562,768 B2 | 10/2013 | Yvart et al. |
| 2004/0202904 A1 * | 10/2004 | Gore .................... F17C 11/00 429/421 |
| 2006/0051638 A1 * | 3/2006 | Gross .................. C01B 3/0005 429/421 |
| 2007/0243433 A1 * | 10/2007 | Kim ................... H01M 8/0631 429/425 |
| 2008/0026269 A1 * | 1/2008 | Shurtleff ........... H01M 8/04007 429/414 |
| 2008/0231836 A1 | 9/2008 | Curello et al. |
| 2008/0236032 A1 | 10/2008 | Kelly et al. |
| 2008/0241613 A1 | 10/2008 | Kelly et al. |
| 2009/0309603 A1 | 12/2009 | Harada et al. |
| 2010/0221619 A1 * | 9/2010 | Fujihara .................. C01B 3/384 429/423 |
| 2011/0033342 A1 * | 2/2011 | Horiguchi ................ C01B 3/02 422/105 |
| 2012/0028144 A1 * | 2/2012 | Tanaka ............... H01M 8/04223 429/423 |
| 2012/0115054 A1 * | 5/2012 | Wallace ................... C01B 3/06 429/413 |

OTHER PUBLICATIONS

Shafirovich et al.; "Combustion-Assisted Hydrolysis of Sodium Borohydride for Hydrogen Generation"; Int'l Journal of Hydrogen Energy; Feb. 2007; vol. 32 Issue 2; p. 207-211.

Ahluwalia et al.; "Automotive Storage of Hydrogen in Alane"; Int'l Journal of Hydrogen Energy; Sep. 2009; vol. 34 Issue 18; p. 7731-7740.

International Patent Application No. PCT/US2013/025657; Int'l Preliminary Report on Patentability; dated Aug. 18, 2015; 7 pages.

* cited by examiner

HYDROGEN GENERATOR WITH FUEL GAUGE

CROSS-REFERENCE TO RELATED APPLICATIONS

This patent application is a Continuation of international patent application PCT/US2013/025657 filed Feb. 12, 2013, the disclosures of which are incorporated by reference in its entirety.

TECHNICAL FIELD

This invention relates to a fuel gauge for a hydrogen generator, a hydrogen generator including the fuel gauge, and a method for determining a relative amount of hydrogen gas that can be provided by a fuel unit in the hydrogen generator

BACKGROUND

Gas generators are used to produce a variety of gases for various purposes. Examples include hydrogen, oxygen, carbon monoxide and carbon dioxide generators. Hydrogen generators are of particular interest because they can be used to provide hydrogen gas that is used as an active material in a fuel cell battery.

Interest in fuel cell batteries as power sources for portable electronic devices has grown. A fuel cell is an electrochemical cell that uses materials from outside the cell as the active materials for the positive and negative electrode. Because a fuel cell does not have to contain all of the active materials used to generate electricity, the fuel cell can be made with a small volume relative to the amount of electrical energy produced compared to other types of batteries.

In some types of hydrogen fuel cells, hydrogen is formed from a hydrogen-containing fuel supplied to the negative electrode side of the fuel cell. In other types of hydrogen fuel cells, hydrogen gas is supplied to the fuel cell from a source outside the fuel cell.

A fuel cell system can include a fuel cell battery, including one or more fuel cells (such as in a fuel cell stack), and a gas source, such as a gas tank or a gas generator. Gas generators that supply gas to a fuel cell can be an integral part of a fuel cell system, they can be removably coupled to the fuel cell system, or they can include replaceable components containing reactants. A removable gas generator can be replaced with another one when the gas producing reactants have been consumed. Removable gas generators can be disposable (intended for only a one-time use) or refillable (intended for use multiple times) to replace consumed reactant materials.

Hydrogen generators can produce hydrogen using a variety of reactants and a variety of methods for initiating the hydrogen generating reactants. Hydrogen gas can be evolved when a hydrogen containing material reacts.

Some hydrogen containing compounds can be heated to evolve hydrogen gas, such as by a thermal decomposition reaction. Such thermal decomposition reactions, such as those of hydrides, can be advantageous over hydrolysis reactions because the yield of hydrogen is greater, it does not produce steam vapor that may have to be removed from the hydrogen gas, and freezing is not a concern.

Gauging the remaining hydrogen containing compound (fuel) is an important consideration during the operation of a hydrogen generator. For example, it can be advantageous for the user of a hydrogen generator to have an indication of the relative quantity of fuel remaining, in order to be able to replenish the supply of hydrogen containing compound with no or minimal disruption of the supply of hydrogen gas to a hydrogen consuming device such as a hydrogen fuel cell.

Various methods of measuring the quantity of hydrogen containing material in a fuel supply are known. Examples are disclosed in U.S. Pat. Nos. 6,155,099; 7,117,732; 7,698,936; 7,642,742; 7,254,983; 7,674,541; and 8,268,028. Some methods use measurement of an electrical magnetic or electro-magnetic property of the hydrogen-containing material, requiring additional hardware to conduct an electric current through the material or create a magnetic field; some require moving a hardware component; and some require monitoring, computing and tracking input and/or output energy for individual fuel cartridges as they are used, either in the hydrogen generator or the fuel unit itself.

In view of the above, an object of the present invention is to provide a method that overcomes disadvantages of the prior art. Preferably a fuel level indicator will have one or more of the following features or advantages: suitable for use with a fuel that is heated to evolve hydrogen gas, adds no or minimal cost to replaceable fuel units, results in low added cost for the hydrogen generator, does not require writing data regarding replaceable fuel units to a digital memory, allows fuel gauging of fuel units that have been previously used and removed from the hydrogen generator, operates reliably in any hydrogen generator orientation, requires no electric current to be conducted through fuel units.

SUMMARY

The above objects are met and the above disadvantages of the prior art are overcome by a hydrogen generator and a fuel gauge according to the invention.

Accordingly, one aspect of the present invention is a hydrogen generator including a replaceable fuel unit and a fuel gauge. The replaceable fuel unit contains a hydrogen-containing material that can release hydrogen gas when heated and whose thermal conductivity is related to a quantity of releasable hydrogen contained therein. The fuel gauge includes a heat source adjacent to the fuel unit, a temperature sensor adjacent to the fuel unit for measuring a temperature of the fuel unit, and a controller for determining a fuel level value based on the measured temperature at a pre-established time and a predetermined relationship between the measured temperature and a releasable hydrogen content of the hydrogen-containing material at the pre-established time. Embodiments of the hydrogen generator can include one or more of the following:
 the thermal conductivity of the hydrogen-containing material is directly or indirectly proportional to the releasable hydrogen content; the hydrogen-containing material can include aluminum hydride;
 the temperature sensor is disposed between the heat source and the fuel unit;
 the heat source is adjacent to a first portion of the fuel unit, and the temperature sensor is adjacent to a second portion of the fuel unit;
 the fuel unit includes a plurality of segregated quantities of the hydrogen-containing material; the fuel gauge can include a plurality of temperature sensors, each temperature sensor disposed adjacent to a segregated quantity of the hydrogen-containing material; the fuel gauge can include a plurality of heat sources, each heat source disposed adjacent to a segregated quantity of the hydrogen-containing material; the fuel gauge can include a single heat source adjacent to each segregated quantity of the hydrogen-containing material and a corresponding single temperature sensor adjacent to each segregated quantity of the hydrogen-containing material;

the fuel level corresponds to at least a pre-established minimum quantity of hydrogen gas that has been released from the hydrogen-containing material;

the fuel level value corresponds to a quantity of releasable hydrogen remaining in the hydrogen-containing material;

the fuel level output is an indication of a quantity of releasable hydrogen remaining in the hydrogen-containing material, based on the measured temperature;

the hydrogen generator further includes at least one of a visible display and an audible signal indicative of hydrogen usage or releasable hydrogen remaining in the fuel unit;

the controller is disposed in the hydrogen generator;

the controller is disposed outside the hydrogen generator each heat source includes an electric heater; and each temperature sensor includes a resistance temperature detector.

A second aspect of the invention is a method of fuel gauging includes the steps: (a) providing a hydrogen generator comprising a housing, a fuel unit containing a hydrogen-containing material disposed in the housing, a heat source adjacent to the fuel unit, and a temperature sensor adjacent to a second portion of the fuel unit; (b) activating the heat source; (c) measuring a temperature with the temperature sensor at a pre-established time after activating the heat source; and (d) processing the measured temperature to determine a fuel level value based on the measured temperature; and (e) generating an output signal corresponding to the fuel level value. Embodiments of the hydrogen generator can include one or more of the following:

the fuel level value corresponds a releasable hydrogen content of the hydrogen-containing material; the fuel level value can correspond to at least a pre-established minimum quantity of hydrogen gas that has been released from the hydrogen-containing material; the fuel level value can correspond to a quantity of releasable hydrogen remaining in the hydrogen-containing material;

the method of fuel gauging further includes the step of providing at least one of a visible display and an audible signal of the hydrogen usage or the quantity of releasable hydrogen remaining;

the fuel unit includes a plurality of segregated quantities of the hydrogen-containing material, a separate heat source and a separate temperature sensor disposed adjacent to each segregated quantity of the hydrogen-containing material, and a fuel level value is determined for individual segregated quantities of the hydrogen-containing material in a predetermined sequence;

the temperature sensor is disposed between the heat source and the fuel unit; and the heat source is adjacent to a first portion of the fuel unit, and the temperature sensor is adjacent to a second portion of the fuel unit.

Unless otherwise specified herein, all disclosed characteristics and ranges are as determined at room temperature (20-25° C.).

DESCRIPTION

The above objectives and advantages are accomplished with a hydrogen generator that makes use of some of the components required to produce hydrogen gas for fuel gauging, thereby minimizing the number of components required solely for fuel gauging, avoiding unnecessary complexity, and minimizing the manufacturing cost of both the hydrogen generator and the fuel units used therein.

Hydrogen gas is produced by heating a hydrogen-containing material, which may be referred to below as a fuel, that releases hydrogen gas when heated. The fuel is contained in one or more replaceable fuel units. The fuel is a material whose thermal conductivity changes as hydrogen gas is released. Preferably the thermal conductivity is proportional to the quantity of hydrogen gas released (and the quantity of releasable hydrogen remaining in the fuel); i.e., the thermal conductivity either increases or decreases as the fuel releases hydrogen gas, due to a difference in thermal conductivity between fresh and dehydrogenated fuel, so the thermal conductivity can provide a measure of both the quantity of hydrogen gas released and the quantity of hydrogen remaining that can be released as hydrogen gas.

The hydrogen generator includes a heat source adjacent to the fuel unit for heating the fuel to release hydrogen gas. The fuel gauge includes a heat source adjacent to the fuel unit as well as a temperature sensor for measuring a temperature at a preestablished time t after activating the fuel gauge heat source (i.e., after the commencement of heating by the fuel gauge heat source) that is indicative of the thermal conductivity of the fuel. A predetermined relationship between the thermal conductivity of the fuel and the releasable hydrogen content of the fuel can be used to determine whether or not at least a minimum quantity of hydrogen gas has previously released from the fuel, the quantity of hydrogen gas that has been previously released, the quantity of releasable hydrogen gas remaining, or any combination thereof. Preferably the fuel gauge heat source is also a heat source for heating the fuel to release hydrogen gas. In some embodiments the fuel gauge temperature sensor can also be used in controlling heating during use of the hydrogen generator to produce hydrogen.

Figure 1A:
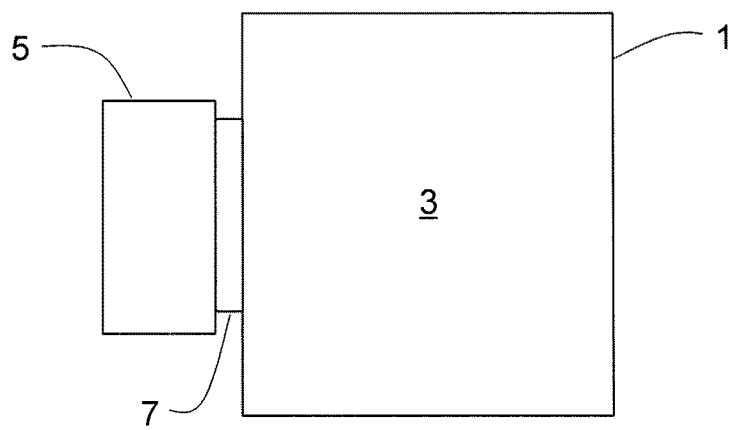
FIG. 1A is a schematic representation of a spatial relationship among a fuel unit, a heat source and a temperature sensor according to a first embodiment of a fuel gauge.

In a first embodiment, illustrated in FIG. 1A, a temperature sensor 7 can be disposed between a heat source 5 and a fuel unit 1 containing fuel 3. When heating commences, heat is conducted from the heat source to the fuel unit. The greater the thermal conductivity of the fuel in the fuel unit, the more quickly heat will be conducted away from the heat source, and the lower the measured temperature will be, so the measured temperature at a set time after heating commences is related to the thermal conductivity of the fuel unit and can be an indication of whether the fuel unit has been previously used, how much hydrogen has been released from the fuel, and how much releasable hydrogen remains in the fuel.

Figure 1B:
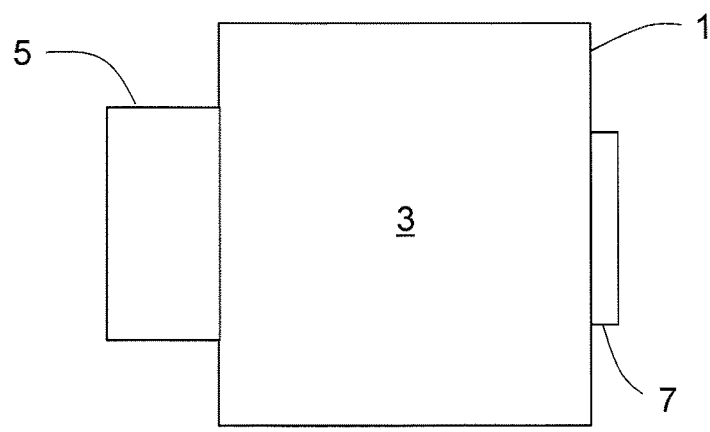
FIG. 1B is a schematic representation of a spatial relationship among a fuel unit, a heat source and a temperature sensor according to a second embodiment of a fuel gauge.

In a second embodiment, illustrated in FIG. 1B, the temperature sensor 7 can be disposed adjacent to a different portion of the fuel unit 1 than the heat source 5. The greater the thermal conductivity of the fuel in the fuel unit, the more quickly after heating commences the measured temperature will rise. As in the first embodiment, the measured temperature at a set time after commencement of heating can be an indication of whether the fuel unit has been previously used, how much hydrogen has been released from the fuel, and how much releasable hydrogen remains in the fuel, though the relationship between the measured temperature and the thermal conductivity of the fuel is opposite that in the first embodiment.

Figure 1C:
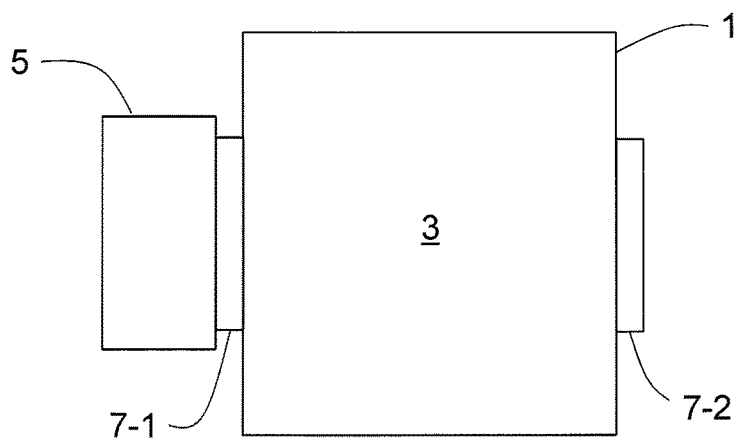
FIG. 1C is a schematic representation of a spatial relationship among a fuel unit, a heat source and two temperature sensors according to a third embodiment of a fuel gauge.

In a third embodiment, illustrated in FIG. 1C, one temperature sensor 7-1 can be disposed between the heat source 5 and the fuel unit 1, and another sensor 7-2 can be disposed adjacent a different portion of the heat unit 1 than the heat source 5. Temperature can be measured at both temperature sensors, and the difference in temperature can be determined. The greater the thermal conductivity of the fuel in the fuel unit, the smaller the difference in temperature will be. Similarly to the second embodiment, the difference in temperature at a set time after commencement of heating can be an indication of whether the fuel unit has been previously used, how much hydrogen has been released from the fuel. In this embodiment, temperature sensor 7-1 can also be used to control the heat source 5 during hydrogen generation, e.g., to maintain the temperature of the heat source 5 in a desired range.

In both the second and third embodiments, the relative locations of the heat source and the temperature sensor(s) can be selected for maximum effectiveness in fuel gauging. The closer a temperature sensor is to the heat source, the more rapid the response will tend to be, but the less accurate the determined quantities of fuel used and fuel remaining will tend to be. To maximize quantitative determinations when the heat source and a temperature sensor are adjacent to different portions of the fuel unit, it is generally preferable to locate the heat source and temperature sensor as far from each other as possible while still being adjacent to the portion of fuel being measured.

In some embodiments, fuel units may contain a single mass of fuel (e.g., as shown in FIGS. 1A, 1B and 1C. The fuel gauge can have a single heat source and a single temperature sensor, a plurality of heat sources and a single temperature sensor, a single heat source and a plurality of temperature sensors, or a plurality of both heat sources and temperature sensors, such as a single temperature sensor used in combination with a corresponding single heat source.

Figure 2:
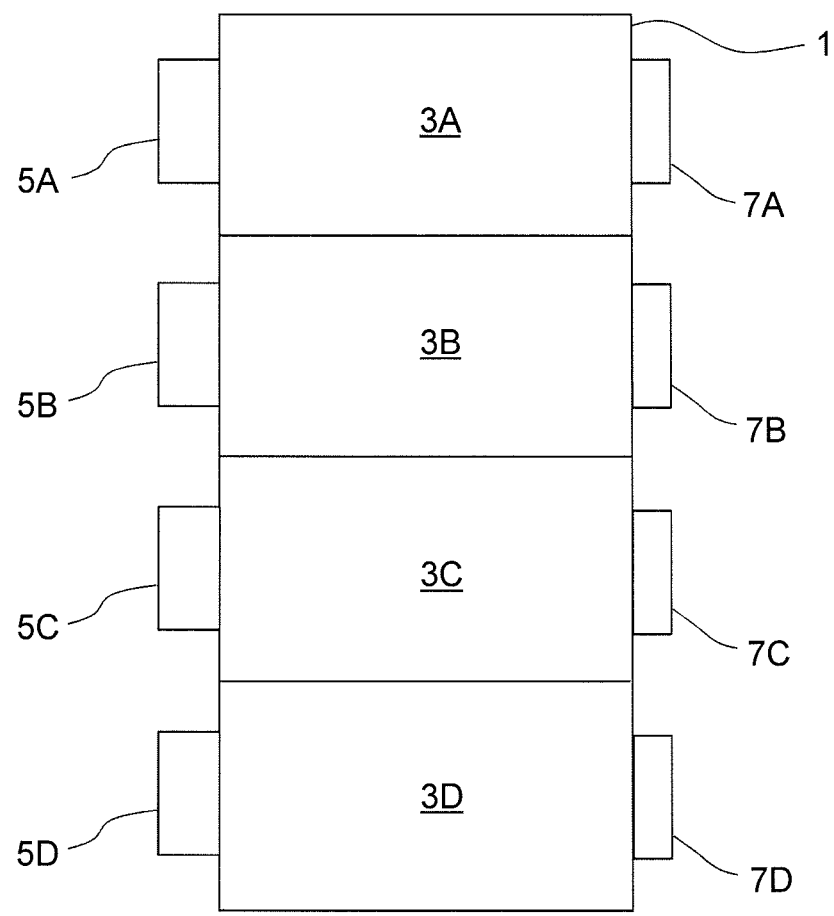
FIG. 2 is a schematic representation of a spatial relationship among a plurality of corresponding segregated quantities of fuel, heat sources and temperature sensors according to an embodiment of a fuel gauge.

In other embodiments, the fuel may be segregated into individual quantities of fuel. Although more than one segregated quantity of fuel can be heated by a single heat source, each segregated quantity of fuel will generally be heated by a separate heat source. Although other combinations are possible, generally each heat source and corresponding segregated quantity of fuel will have a single corresponding temperature sensor, as illustrated in FIG. 2, in which corresponding quantities of fuel 3, heat sources 5 and temperature sensors 7 are shown with the same letters (e.g., 3A, 5A and 7A; 3B, 5B and 7B; and so on). In this way, each segregated quantity of fuel can have its own fuel gauge unit.

The fuel gauge can be used to merely indicate whether a fuel unit or a segregated quantity of fuel in a fuel unit has been previously used to produce hydrogen gas, based on the thermal conductivity with fresh vs. partially used fuel (i.e., fuel that contains its full intended amount of releasable hydrogen vs. fuel from which a portion of the original amount of releasable hydrogen has been released as hydrogen gas). In fuel units containing a plurality of segregated quantities of fuel, the fuel gauge can be used to determine whether each of the segregated quantities of fuel has been previously used, and the number of used or unused segregated quantities of fuel can provide an approximate measure of the total quantity of fuel consumed or remaining, respectively. The more segregated quantities of fuel and pairs of heat sources and temperature sensors, the more precise this approximation will be.

Alternatively, the fuel gauge can be used to determine the fuel content of a quantity of fuel (e.g., as a fraction or percent of the original releasable hydrogen in the fresh fuel) that has been used or remains, particularly if there is a large difference in thermal conductivity between fresh fuel and fuel from which all of the releasable hydrogen has been released, using a predetermined relationship between measured temperature and the quantity of releasable hydrogen released or remaining.

The hydrogen-containing material is a material that releases hydrogen gas and whose thermal conductivity before hydrogen gas is released is different from its thermal conductivity after hydrogen gas is released. Materials with larger differences in thermal conductivity before vs. after the release of hydrogen gas are preferred if all other characteristics are equivalent. Suitable materials may include materials that can reversibly absorb and desorb hydrogen (e.g., graphene, carbon nanotubes and metal hydrides such as $AB_5$ and $AB_2$ type hydrogen storage alloys (e.g., titanium-manganese alloy, mischmetal-nickel alloy, lanthanum-nickel-cobalt alloy, and lanthanum-nickel alloy)), materials that can react to produce hydrogen gas upon thermal decomposition (e.g., chemical hydrides such as lithium hydride, lithium borohydride, sodium borohydride, lithium aluminum hydride, sodium aluminum hydride, aluminum hydride (alane) and ammonia borane), and mixtures or combinations thereof.

The hydrogen-containing material can be combined with one or more additives in a fuel mixture. Examples of possible additives include binders, stabilizing compounds, thermally conduction materials, flow agents, catalysts and ignition materials. If additives are included, the thermal conductivity of the fuel mixture before heating to release hydrogen gas must be different from the thermal conductivity of the fuel mixture after heating to release hydrogen gas.

Suitable fuels can release hydrogen gas as a result of a self-sustaining exothermic reaction, which requires heating only to an initiation temperature, or they can require additional heating in order to sustain the release of hydrogen gas. This latter category of fuels is referred to below as endothermic. The additional heat can be provided by the heat source, or the fuel unit can contain a material that will react exothermically to initiate and/or sustain the release of hydrogen gas from an endothermic fuel. An exothermic material included in the fuel unit to initiate/sustain the release of hydrogen gas from an endothermic fuel is referred to below as an ignition material. An ignition material can be part of the fuel mixture, or it can be a separate part of the fuel unit, such as a pellet or coating in thermal communication with the fuel. In some embodiments, the ignition material can also release hydrogen gas as it reacts, adding to the total quantity of hydrogen gas that can be produced by the fuel unit. Examples of possible ignition materials include metal/metal oxide multilayers such as $Ti/Pb_3O_4$, $Zr/Fe_2O_3$, guanidinium borohydride, B—N compounds blended with oxidizers such as ammonium nitrate or $Sr(NO_3)_2$ as described in US2011/0027168A1, metal/metal multilayered thin films and structures such as Ni/Al as described in U.S. Pat. No. 7,867,441, autoignition compositions such as silver nitrate mixed with potassium nitrate and molybdenum metal as described in U.S. Pat. No. 6,749,702, complex hydride, oxidizer, and S compositions such as described in U.S. Pat. No. 7,964,111, and the compositions described in patents US2008/0236032A1 and US 2008/0241613A1. Other compositions include gels of metals and water such as Mg/water/poly(acrylamide-co-acrylic acid) alone or in combination with sodium borohydride (Varma, et al. Chem. Eng. Sci. 2010, 65, 80-87 and Int. J. Hydrogen En 2007, 32, 207-211, respectively). A preferred fuel is aluminum hydride (alane), which undergoes an endothermic decomposition to aluminum metal and hydrogen gas when heated. There is a significant difference in thermal conductivity between alane and aluminum metal, making it especially useful for use in the present invention.

The fuel unit can be contained within a package. The package material must include at least a thermally conductive portion adjacent to each heat source. It may be desirable for the package to include a material that is a poor thermal conductor around those portions to minimize heat loss and to prevent heating unintended portions of the fuel unit (e.g., nearby segregated quantities of the hydrogen-containing material). For example, the package can include a sheet of polymeric material with poor thermal conductivity surrounding areas of a metal such as aluminum with good thermal conductivity. Examples of such materials are disclosed in International Application No. PCT/US13/021538, filed 15 Jan. 2013.

Suitable heat sources can be readily turned on and off. Electric heating elements, such as resistive heating elements, are particularly well suited. Energy to operate the heat source can be provided from within or outside the hydrogen generator. For example, electric energy can be provided by any one or a combination of a primary battery, a secondary battery, a fuel cell, a capacitor and a public utility.

A suitable temperature sensor can preferably provide an electrical output. Examples of suitable temperature sensors include thermocouples and resistance temperature detectors (RTDs). Thermocouples use the Seebeck effect to generate a voltage and may be more rugged that RTDs. RTDs require electric power to operate, are generally more accurate and may be better suited for lower temperatures.

A relationship between the temperature at the temperature sensor (or between two temperature sensors) at a given time after turning on the heat source can be established for a given fuel mixture composition and various levels of use, under actual or simulated conditions of planned use. When multiple heat sources and/or temperature sensors are used, this relationship may be different between different heat source/temperature sensor pairs. The relationship can be determined empirically, such as by testing a fuel unit in a hydrogen generator, or computer modeling can be used.

If it is desired to determine whether or not a fuel unit or a segregated quantity of fuel in a fuel unit has been used, the measured temperature (or difference in temperatures between two temperature sensors) at a preselected time after commencing heating is compared to the expected temperature after a pre-established minimum quantity of hydrogen gas has been released. For example, if less than this pre-established minimum quantity of hydrogen has been released, that quantity of fuel will be considered "unused", and if the minimum quantity or more hydrogen has been released, that quantity of fuel will be considered "used". This method of fuel gauging is generally more appropriate when the quantity of fuel in each segregated quantity is small.

If it is desired to determine an amount of fuel consumed or remaining in a fuel unit or segregated quantity of fuel, the measured temperature at a preselected time after commencing heating is compared to expected temperatures with various known amounts of releasable hydrogen released or remaining.

A controller can be used to process measured temperatures to determine a fuel level. The controller can include an integrated circuit, such as an Application Specific Integrated Circuit (ASIC) or a Field Programmable Gate Array (FPGA), or the controller can be included in a computer processing unit (CPU), such as a CPU that is part of a device being supplied with the hydrogen gas. The controller can be used for other purposes as well. For example, it can operate the heat source(s) for fuel gauging and for hydrogen generation; it can control the heat source(s) to maintain the heat produced in a desired range; it can control the duration of heating during fuel gauging, it can selectively operate one or more heat sources during fuel gauging and during hydrogen generation, and it can be used to authenticate acceptable fuel units. The controller can be in or on the hydrogen generator, or it can be located elsewhere, such as in a device being supplied with hydrogen gas by the hydrogen generator.

Comparisons of measured vs. expected temperatures can be made using algorithms or look-up tables for example. The results of these comparisons can be output in various ways, such as visible displays or audible signals for the user, or output to a controller. For example, a visible display can be used to inform a user of the percentage or fraction of fuel in the fuel unit that has been used or remains; a visible display and/or an audible signal can inform a user that only a limited quantity of fuel remains, and the fuel unit should be replaced soon; or an electronic output to a controller can be used to control other functions of the hydrogen generator.

In various embodiments, fuel gauging can be done continuously, at predetermined times, when initiated by a user, or in combinations thereof. In embodiments in which the fuel unit contains multiple segregated quantities of fuel, fuel gauging can be included in the startup of hydrogen generation. This can be useful in identifying which of the segregated quantities of fuel to begin using, so energy will not be wasted heating segregated quantities containing no more releasable hydrogen. This can avoid having to record which segregated quantities have or have not been used up (e.g., in a memory device in a controller or the fuel unit), and it is well-suited to situations in which a fuel unit may be removed and reinstalled in a hydrogen generator.

When fuel gauging is not being done as part of a startup routine, it may be desirable to operate the fuel gauge heat source for a limited time and/or at a limited power level, to conserve energy and to minimize or prevent the release of hydrogen gas during fuel gauging.

The following examples illustrated various embodiments of how a fuel gauge can be used in a hydrogen generator. In each of these examples it is assumed that the fuel mixture becomes more thermally conductive as hydrogen gas is released from the fuel, though in other embodiments the fuel mixture could become less thermally conductive.

Example 1

Figure 3:
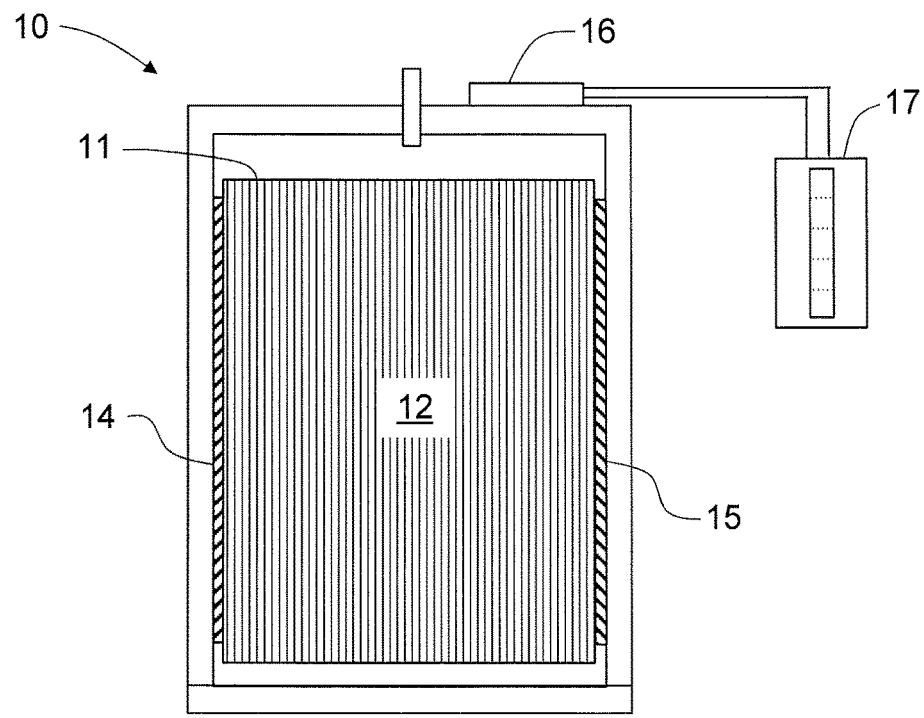
FIG. 3 is a schematic representation of a first embodiment of a hydrogen generator with a fuel gauge.

A first example of the use of a fuel gauge is illustrated in FIG. 3. A hydrogen generator 10 contains a single fuel unit 11. The fuel unit 11 contains a single mass 12 of a fuel mixture. A single heat source 14 is disposed against a side of the fuel unit 11, and a single temperature sensor 15 is disposed against an opposite side of the fuel unit 11. A predetermined relationship is established between the temperature measured by the temperature sensor 15 at, for example, one second after turning on the heat source 14 when 25, 50, 75 and 100 percent of the releasable hydrogen has been released (i.e., when 75, 50, 25 and 0 percent of the releasable hydrogen remains). The heat source 14 is energized, and the temperature is measured by the temperature sensor 15 one second later. The measured temperature is compared to data of the predetermined temperature—fuel level relationship by a controller 16, and an electrical output to a visible display 17 can display an indication (e.g., a numerical value or number of icons) of the closest fuel remaining value (75, 50, 25 or 0). In an alternative to this example, the temperature sensor 15 is disposed between the heat source 14 and the fuel unit 11 (see FIG. 1A).

Example 2

Figure 4:
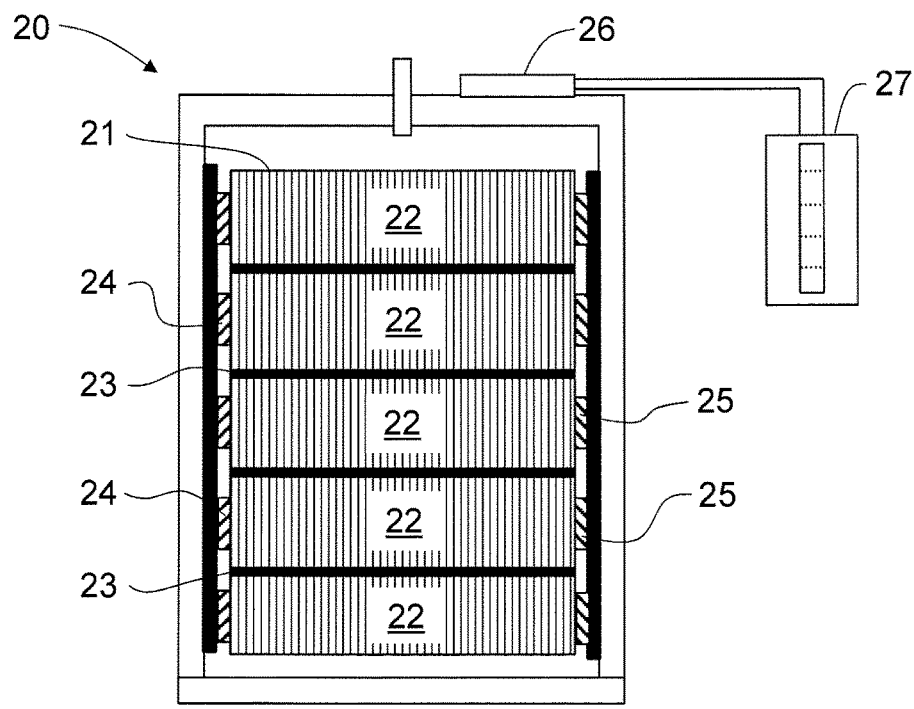
FIG. 4 is a schematic representation of a second embodiment of a hydrogen generator with a fuel gauge.

A second example of the use of a fuel gauge is illustrated in FIG. 4. A hydrogen generator 20 contains a single fuel unit 21. The fuel unit 21 contains a plurality of segregated quantities (pellets) 22 of a fuel mixture. A plurality of heat sources 24 is disposed against a side of the fuel unit 21, with one heat source 24 against each of the pellets 22, and a plurality of temperature sensors 25 is disposed against an opposite side of the fuel unit 21, with one temperature sensor 25 against each of the pellets 22. The pellets 22 are separated from each other by a layer of thermal insulation 23 to prevent heat from one pellet 22 from heating an adjacent pellet 22 sufficiently to release hydrogen gas. A minimum level of releasable hydrogen remaining (e.g., 75 percent) is selected to represent an "unused" pellet 22, and a predetermined relationship is established between the temperature measured by each temperature sensor 25 at, for example, one second after turning on the corresponding heat source 24 disposed against the same pellet 22 when 75 percent of the fuel remains. A heat source 24 for a selected pellet 22 is energized, and the temperature is measured by the corresponding temperature sensor 25 for that pellet 22 one second later. The measured temperature is compared to the predetermined temperature corresponding to 75 percent of the releasable hydrogen remaining in that pellet 22 by the controller 26. If the measured temperature is less than the predetermined temperature corresponding to 75 percent remaining in that pellet 22, the pellet 22 is considered "unused", and if the measured temperature is equal to or greater than the predetermined temperature, the pellet 22 is considered "used". Each of the pellets 22 can be tested in this manner in an established sequence until an unused pellet 22 is identified. The fraction of used pellets 22 in the fuel unit 21 corresponds to the approximate amount of fuel used, and the fraction of unused pellets 22 corresponds to the approximate amount of fuel remaining. The more pellets 22 in the fuel unit 21, the more precise the indication of the fuel level will be. A corresponding electrical output can be provided by the controller 26 to the display 27 to display this information to the user. In one variation of this example, the temperature sensors 25 can be disposed between the heat sources 24 and the fuel unit 21 (see FIG. 1A). In another variation, each heat source/temperature sensor pair can be used to determine an approximate quantity of fuel remaining in individual pellets 22, as in Example 1, and this information can be used to provide a quantitative fuel remaining indication for the entire fuel unit 21.

The fuel gauge described above can be adapted for use in thermally initiated hydrogen generators of various sizes, shapes and designs, and with various numbers, sizes, shapes and designs of fuel units, as long as there is a sufficient difference in thermal conductivity between the fresh fuel mixture and fuel mixture from which hydrogen gas has been released. The required magnitude of this difference will vary, depending on such factors as the amount of fuel mixture being tested, the amount of heat produced by the heat sources, and the relative locations of the heat sources and temperature sensors.

All references cited herein are expressly incorporated herein by reference in their entireties. To the extent publications and patents or patent applications incorporated by reference contradict the disclosure contained in the present specification, the present specification is intended to supersede and/or take precedence over any such contradictory material.

It will be understood by those who practice the invention and those skilled in the art that various modifications and improvements may be made to the invention without departing from the spirit of the disclosed concept. The scope of protection afforded is to be determined by the claims and by the breadth of interpretation allowed by law.

The invention claimed is:

1. A hydrogen generator comprising:
    a replaceable fuel unit containing a hydrogen-containing material that can release hydrogen gas when heated and whose thermal conductivity is related to a quantity of releasable hydrogen contained therein; and
    a fuel gauge comprising a heat source adjacent to the fuel unit, a first temperature sensor adjacent to the fuel unit for measuring a first temperature, a second temperature sensor adjacent to the fuel unit for measuring a second temperature, and a controller for determining a fuel level value based on the first and second temperatures at the first temperature sensor and the second temperature sensor at a pre-established time after activating the heat source;
    wherein the first temperature sensor is disposed between the heat source and the fuel unit;
    wherein the second temperature sensor is disposed at a portion of the fuel unit different from the position of the first temperature sensor.

2. The hydrogen generator according to claim 1, wherein the thermal conductivity of the hydrogen-containing material is directly or indirectly proportional to the releasable hydrogen content.

3. The hydrogen generator according to claim 2, wherein the hydrogen-containing material comprises aluminum hydride.

4. The hydrogen generator according to claim 1, wherein the fuel unit comprises a plurality of segregated quantities of the hydrogen-containing material.

5. The hydrogen generator according to claim 4, wherein the fuel gauge comprises a plurality of pairs of temperature sensors, each pair of temperature sensors disposed adjacent to one of the plurality of segregated quantities of the hydrogen-containing material.

6. The hydrogen generator according to claim 5, wherein the fuel gauge comprises a plurality of heat sources, each heat source disposed adjacent to a segregated quantity of the hydrogen-containing material.

7. The hydrogen generator according to claim 1, wherein the fuel level value corresponds to a pre-established minimum quantity of hydrogen gas that has been released from the hydrogen-containing material.

8. The hydrogen generator according to claim 1, wherein the fuel level value corresponds to a quantity of releasable hydrogen remaining in the hydrogen-containing material.

9. The hydrogen generator according to claim 1, wherein the hydrogen generator further comprises at least one of a visible display and an audible signal corresponding to one of hydrogen usage and releasable hydrogen remaining in the fuel unit.

10. The hydrogen generator according to claim 1, wherein the heat source comprises an electric heater.

11. The hydrogen generator according to claim 1, wherein the temperature sensor comprises a resistance temperature detector.

12. A method of fuel gauging comprising the steps:
(a) providing a hydrogen generator comprising a housing, a fuel unit containing a hydrogen-containing material disposed in the housing, a heat source adjacent to the fuel unit, a first temperature sensor adjacent to the fuel unit and disposed between the heat source and fuel unit, and a second temperature sensor adjacent to the fuel unit and disposed at a portion of the fuel unit different from the position of the first temperature sensor;
(b) activating the heat source;
(c) measuring a first temperature with the first temperature sensor and a second temperature with the second temperature sensor at a pre-established time after activating the heat source;
(d) processing the measured first and second temperatures to determine a fuel level value based on the first and second measured temperatures; and
(e) generating an output signal corresponding to the fuel level value.

13. The method of fuel gauging according to claim 12, wherein the fuel level corresponds to a releasable fuel content of the hydrogen-containing material.

14. The method of fuel gauging according to claim 12, wherein the fuel unit comprises a plurality of segregated quantities of the hydrogen-containing material, a separate heat source and a separate pair of first and second temperature sensors are disposed adjacent to each segregated quantity of the hydrogen-containing material, and a fuel output level is determined for individual segregated quantities of the hydrogen-containing material in a predetermined sequence.

15. The method of claim 12, wherein the processing step comprises determining the difference between the first and second temperatures.

\* \* \* \* \*